(12) United States Patent
Morikawa et al.

(10) Patent No.: US 9,106,043 B2
(45) Date of Patent: Aug. 11, 2015

(54) INSERT MOLDING METHOD AND INNER TERMINAL

(75) Inventors: Taishi Morikawa, Makinohara (JP); Hidenori Kanda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 388 days.

(21) Appl. No.: 13/496,265

(22) PCT Filed: Sep. 15, 2010

(86) PCT No.: PCT/JP2010/065989
§ 371 (c)(1),
(2), (4) Date: Mar. 15, 2012

(87) PCT Pub. No.: WO2011/034111
PCT Pub. Date: Mar. 24, 2011

(65) Prior Publication Data
US 2012/0175145 A1    Jul. 12, 2012

(30) Foreign Application Priority Data
Sep. 17, 2009 (JP) .................. 2009-215919

(51) Int. Cl.
H01B 3/30     (2006.01)
H01R 43/24    (2006.01)
B29C 45/14    (2006.01)
H01R 4/18     (2006.01)
H01R 101/00   (2006.01)

(52) U.S. Cl.
CPC .............. *H01R 43/24* (2013.01); *B29C 45/14* (2013.01); *B29C 45/14418* (2013.01); *B29C 45/14639* (2013.01); *H01R 4/184* (2013.01); *H01R 2101/00* (2013.01)

(58) Field of Classification Search
CPC .............................. B29C 45/14; H01R 43/24
USPC .......................................................... 264/276
See application file for complete search history.

(56) References Cited

U.S. PATENT DOCUMENTS

| 5,203,725 A | 4/1993 | Brunker et al. |
| 5,259,768 A | 11/1993 | Brunker et al. |
| 5,309,630 A | 5/1994 | Brunker et al. |
| 5,522,737 A | 6/1996 | Brunker et al. |
| 5,713,764 A | 2/1998 | Brunker et al. |

(Continued)

FOREIGN PATENT DOCUMENTS

| GB | 2 084 412 A | 4/1982 |
| JP | 02049386 A | 2/1990 |

(Continued)

OTHER PUBLICATIONS

Japanese-to-English machine translation of Morikawa, Electric Contact Part Structure of Terminal Fitting, publ. date Aug. 6, 2009 in Japanese as JP2009176555 (A).*

(Continued)

*Primary Examiner* — Joseph S. Del Sole
*Assistant Examiner* — Lawrence D Hohenbrink, Jr.
(74) *Attorney, Agent, or Firm* — Sughrue Mion, PLLC

(57) ABSTRACT

A resin material can be prevented from flowing to a front end and a rear end of an inner terminal during an insert molding. Under a state that a hollow and tubular main body part (11c) of an inner terminal (11) formed by covering one of two end parts of a rectangular piece with the other is held by metal molds (14), (15) and (16), the resin material is injected.

3 Claims, 5 Drawing Sheets

(56) References Cited

U.S. PATENT DOCUMENTS

| | | | |
|---|---|---|---|
| 5,853,303 | A | 12/1998 | Brunker et al. |
| 5,921,815 | A | 7/1999 | Brunker et al. |
| 6,019,639 | A | 2/2000 | Brunker et al. |
| 6,527,989 | B1 * | 3/2003 | Onoda .................. 264/40.1 |
| 2002/0182935 | A1 | 12/2002 | Monde et al. |
| 2008/0012173 | A1 * | 1/2008 | Asao ..................... 264/255 |
| 2009/0068865 | A1 | 3/2009 | Suzuki et al. |

FOREIGN PATENT DOCUMENTS

| | | | |
|---|---|---|---|
| JP | 6-96814 A | | 4/1994 |
| JP | 696814 A | | 4/1994 |
| JP | 8162227 A | | 6/1996 |
| JP | 09102342 A | | 4/1997 |
| JP | 2000-77160 A | | 3/2000 |
| JP | 200077160 A | | 3/2000 |
| JP | 2000077160 A | * | 3/2000 |
| JP | 2001-210421 A | | 8/2001 |
| JP | 2001210421 A | | 8/2001 |
| JP | 2006012710 A | | 1/2006 |
| JP | 2006024499 A | | 1/2006 |
| JP | 2007115429 A | * | 5/2007 |
| JP | 2007234463 A | | 9/2007 |
| JP | 2009176555 A | * | 8/2009 |

OTHER PUBLICATIONS

Office Action dated Dec. 30, 2013, issued by the State Intellectual Property Office of the People's Republic of China in counterpart Chinese Application No. 201080041168.7.

International Search Report (PCT/ISA/210) issued on Oct. 12, 2012 in the International Patent Application No. PCT/JP2010/065989.

Written Opinion (PCT/ISA/237) issued on Oct. 12, 2012 in the International Patent Application No. PCT/JP2010/065989.

Office Action, dated Mar. 5, 2014, issued by the European Patent Office in counterpart European Application No. 10 817 224.8.

Office Action, dated Aug. 23, 2013, issued by the Korean Intellectual Property Office in Republic of Korea, in counterpart application No. 1020127006941.

Office Action dated Nov. 5, 2013, issued by the Japan Patent Office in corresponding Japanese Application No. 2009-215919.

Search Report dated Feb. 19, 2013 issued by the European Patent Office in corresponding European Patent Application No. 10817224.8.

Ron D. Douglas, "Injection Molding of Electrical Parts in Today's Materials", Sep. 25, 1989, pp. 133-136, XP010090497.

Office Action dated Aug. 13, 2014 issued by The Intellectual Property Office of the People's Republic of China in counterpart Chinese application No. 201080041168.7.

Office Action dated Feb. 13, 2015 issued by The State Intellectual Property Office Of The People's Republic Of China in counterpart Chinese Application No. 201080041168.7.

* cited by examiner

INSERT MOLDING METHOD AND INNER TERMINAL

TECHNICAL FIELD

The present invention relates to an insert molding method that a metal mold is charged with an inner terminal for a connector, and then, the inner terminal is enclosed by an insulator injected to the metal mold and solidified, and an insert molded inner terminal.

BACKGROUND ART

A request for a high speed of a signal processed in an electronic circuit and a miniaturization of a device is outstandingly increased. Thus, in the field of a connector, various proposals are presented to meet a high speed and high density signal circuit. One of important things for the connector is a matching of impedance to meet the high speed of the signal. In the matching of impedance (an impedance matching), when the impedances of signal circuits which are connected to each other are mismatched with each other, since a reflection of the signal arises in a connecting part (a connector part) of the signal circuits respectively, the impedance is matched with a prescribed impedance (for instance, 75Ω, 95Ω, etc.). It is important to suppress the occurrence of a reflected wave of a high frequency signal by taking the matching of impedance for achieving an acceleration of a signal transmission speed.

Therefore, usually, a method for obtaining a matching of impedance by adjusting an area of a main body part of a terminal is disclosed in, for instance, patent literature 1. This method is unique as a method for obtaining the matching of impedance. However, when an optimum form is designed, since an adjustment is required by changing a metal mold, this method is not suitable for a small quantity of production.

Further, a method for adjusting an impedance so as to be reduced by adjusting an opposed area to an adjacent contact is disclosed in patent literature 2. This method cannot meet an impedance lower than a prescribed impedance in view of design.

Further, patent literature 3 discloses a connector having an insulator and two or more connector parts arranged in parallel in the insulator in which the insulator is formed with a resin component obtained by mixing 5 to 85 wt % of ceramics dielectric powder having 30 or more of relative dielectric constant measured under 1 MHz at 25° C. in a matrix resin. According to this method, impedance can be changed without changing a form of the connector. In this method, since the impedance is determined in accordance with the relative dielectric constant of a resin material to be used, an inconvenience arises that flexibility in design of the connector is not obtained.

Thus, in a connector for a coaxial cable having a structure that supports an inner terminal for connecting a core wire through an insulating member, an area arises in which a shield is insufficient, so that impedance is high in the vicinity of the area to generate the reflected wave as described above or cause a transmission efficiency to be deteriorated in that part. In this case, the form (the thickness) of the insulating member is adjusted to adjust the relative dielectric constant of a resin material so that the impedance may be adjusted. However, in this case, an operation is necessary for pressing-in the inner terminal to an accommodating hole of the insulating member having a prescribed relative dielectric constant. When the insulating member is formed to be thin in order to lower the impedance, an inconvenience is caused to occur that an insulating coat is damaged or the inner terminal is broken during the pressing-in operation.

On the other hand, in order to avoid the inner terminal from being broken, a method is contemplated to apply an insert molding to the inner terminal by a resin material by using a metal mold. In the insert molding, a pressing-in operation of the inner terminal to the insulating member is not necessary. Thus, the damage of the insulating coat or the injury of the inner terminal can be avoided. Further, although the insulating member is formed to be thin so as to obtain prescribed impedance, the inner terminal can be assuredly integrally held.

LITERATURE OF RELATED ART

Patent Literature

Patent Literature 1: JP-A-6-96814
Patent Literature 2: JP-A-8-162227
Patent Literature 3: JP-A-2001-210421

SUMMARY OF THE INVENTION

Problems that the Invention is to Solve

The above-described usual insert molding method of the inner terminal includes below-described problems to be solved. Namely, an occasion may be considered that during the insert molding of the inner terminal, the resin material flows out to be solidified in an outer periphery or an inner periphery of a front end or a rear end of the inner terminal installed in the metal mold, so that an electrical and mechanical contact of the inner terminal and an inner terminal of a mate side connector or an electric connection to a core wire of a shield electric wire is prevented.

The present invention is devised by considering the above-described circumstances and it is an object of the present invention to provide an insert molding method and an inner terminal which can prevent a resin material from flowing out to a front end and a rear end of an inner terminal during an insert molding in the insert molding method of the inner terminal in which the inner terminal is accommodated in a thin resin material by the insert molding to reduce impedance.

Means for Solving the Problems

In order to achieve the above-described object, an insert molding method of an inner terminal according to the present invention is characterized by below-described (1) and (2).

(1) An insert molding method of an inner terminal in which after a metal mold is charged with an inner terminal for a connector, a resin material is injected and the inner terminal is enclosed by the resin material and solidified, wherein under a state that a hollow and tubular main body part of the inner terminal formed by covering one of two end parts of a rectangular piece with the other is held by the metal mold, the resin material is injected.

(2) An insert molding method having the structure of the above-described (1), wherein under a state that at least a rear end and an arbitrary part excluding the rear end of the main body part of the inner terminal is held by the metal mold, the resin material is injected.

According to the insert molding method having the structure of the above-described (1) and (2), when the metal mold holds the main body part of the inner terminal, a slit is completely closed which is formed by covering one of the two end parts with the other to prevent the resin material from entering an inner part from an outer part of the main body part. Accordingly, the resin material in the hollow and tubular main body part can be avoided from passing through the front end and the rear end of the main body part to flow out to an external part.

In order to achieve the above-described object, an inner terminal according to the present invention is characterized by below-described (3).

(3) An inner terminal insert molded by a resin material, wherein the inner terminal includes a hollow and tubular main body part formed by covering one of two end parts of a rectangular piece with the other.

According to the inner terminal having the structure of the above-described (3), when the metal mold holds the main body part of the inner terminal, the slit is completely closed which is formed by covering one of the two end parts with the other to prevent the resin material from entering an inner part from an outer part of the main body part. Accordingly, the resin material in the hollow and tubular main body part can be avoided from passing through the front end and the rear end of the main body part to flow out to an external part. As a result, an electrical and mechanical connection of an inner terminal of a mate connector side to the inner terminal can be assuredly obtained and an electrical and mechanical connection to a core wire of a shield electric wire by soldering or caulking can be ensured.

Advantage of the Invention

According to the present invention, the resin material can be prevented from flowing out to the front end and the rear end of the inner terminal during a molding inserting. As a result, the electrical and mechanical connection of the inner terminal of the mate side connector to the front end or an electrical and mechanical connection of the core wire of the shield electric wire to the rear end can be respectively assuredly ensured.

As described above, the present invention is briefly explained. Further, when an exemplary embodiment for carrying out the present invention that is described below is read by referring to the attached drawings, a detail of the present invention will be more clarified.

BRIEF DESCRIPTION OF THE DRAWINGS

FIGS. 1 (a) to 1(d) respectively show diagrams of one processes of the molding method.

MODE FOR CARRYING OUT THE INVENTION

Now, an insert molding method of an inner terminal according to one exemplary embodiment of the present invention will be described below by referring to FIG. 1 to FIG. 10.

Figure 1:
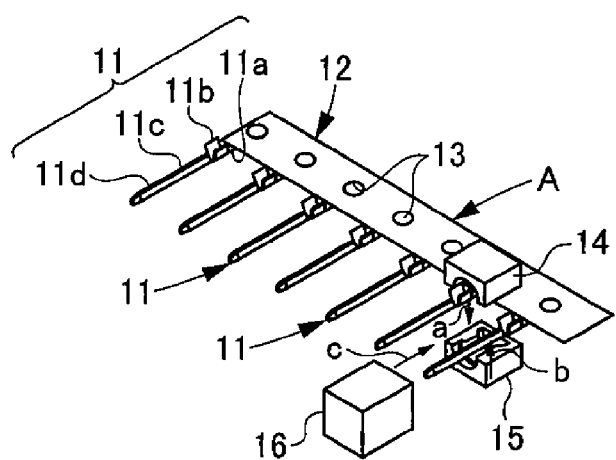
FIG. 1 is a molding process diagram showing a molding method of an inner terminal according to an exemplary embodiment of the present invention.
Figure 1:
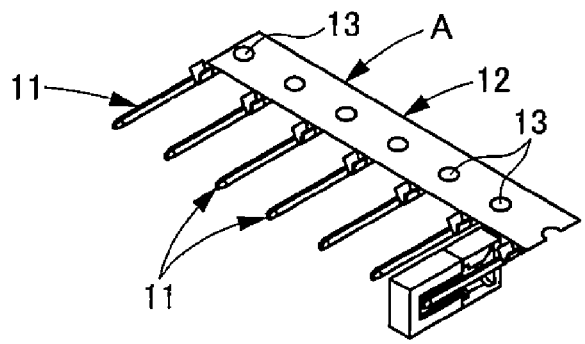
Figure 1:
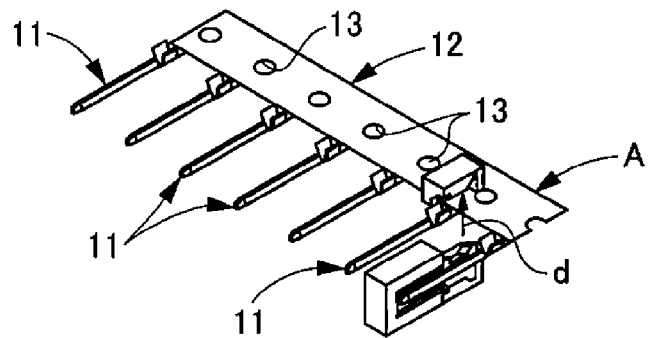
Figure 1:
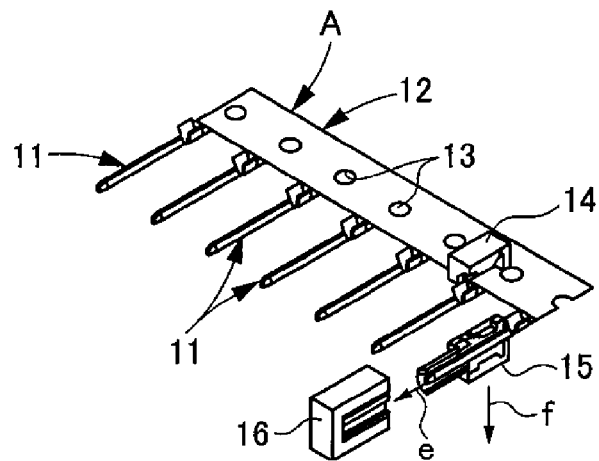

FIG. 1 is a molding process diagram showing a molding method of an inner terminal according to an exemplary embodiment of the present invention. Initially, by referring to the molding process diagram, the insert molding method of the inner terminal will be described. In carrying out the molding method of the inner terminal, a chain terminal A including a plurality of inner terminals 11 and a carrier 12 is prepared. The carrier 12 is formed with a long belt shaped electrically conductive metal piece. The plurality of inner terminals 11 are continuously and integrally arranged in one row in a transverse direction in one side of the belt shaped part.

The inner terminal 11 includes a connecting part 11a, a pressure contact part (a barrel part) 11b and a main body part (a male tab part) 11c. The connecting part 11a of them is a short and thin belt shaped part continuous to the carrier 12, and the pressure contact part 11b is provided continuously to the connecting part 11a. The pressure contact part 11b is formed substantially in the shape of U in section. Two pieces of the pressure contact part 11b which rise in the shape of U are used for caulking and fixing a core wire of a shield electric wire.

Further, the main body part 11c is a part formed by press working a rectangular shaped piece in a thin tubular form in a longitudinal direction as a central axis and an end part thereof has a tapered form. The main body part 11c is a part connected to an inner terminal (a female side terminal) of a mate side connector. Further, the main body part 11c has a slit 11d formed when the main body part 11c is formed in the shape of a thin tube. This slit 11d is a cut out part extending in the longitudinal direction of the main body part 11c. When the main body part 11c is press worked in the tubular form, one of two end parts of the rectangular piece is located above the other end part, that is, one end part is formed so as to cover the other end part. By using the slit 11d, an adhesion to a metal mold can be improved due to a deformation of the main body part during a below-described insert molding and a connection to the inner terminal of the mate side connector is flexibly and smoothly carried out. The slit 11d is a fine gap. As described below, the slit is closed during the insert molding. Thus, synthetic resin liquid as a resin material does not leak into an inner part of the main body part 11c through the slit 11d.

In the carrier 12, fitting holes 13 to which protruding parts (not shown in the drawing) of a transporting device such as a robot arm used during an assembling operation of the connector are fitted are arranged in parallel in the longitudinal direction. When the connector is assembled, under a state that the protruding parts of the transporting device are fitted to the fitting holes 13, an entire part of the chain terminal A can be moved.

Figure 3:
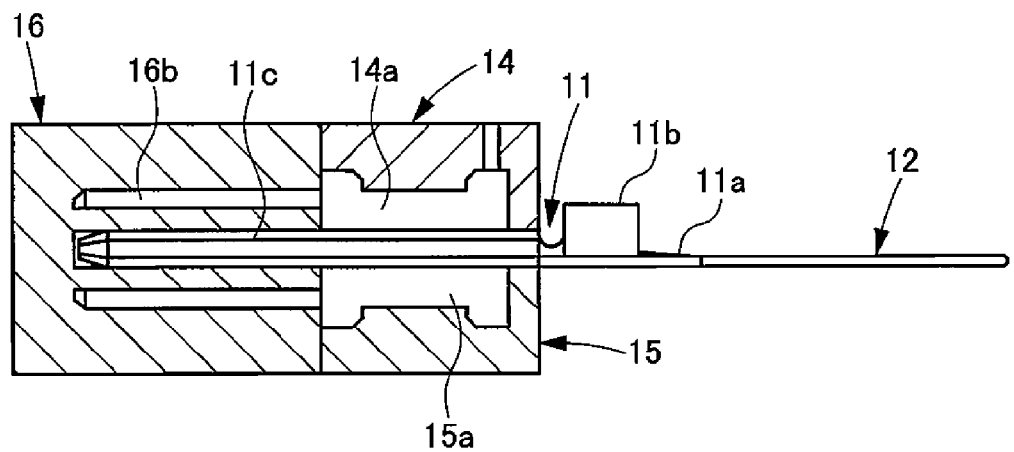
FIG. 3 is a longitudinally sectional view showing a state that the molding metal mold is attached to the inner terminal shown in FIG. 1.

Then, a metal mold B is attached to the inner terminal 11 of the chain terminal A having such a structure. The metal mold B includes an upper mold 14, a lower mold 15 and a slide mold 16. As shown in FIG. 1(a) and FIG. 3, the upper mold 14 and the lower mold 15 have sizes and forms that cover a prescribed length from a rear end of the main body part 11c of the inner terminal 11 to an intermediate part of the main body part 11c respectively from upper and lower directions (a part of the main body part 11c covered with the upper mold 14 and the lower mold 15 is referred to as a rear end part of the main body part 11c). The slide mold 16 has a size and a form that can be inserted in the axial direction of the main body part 11c so as to cover a prescribed length from a front end of the main body part 11c to the intermediate part of the main body part 11c (a part of the main body part 11c covered with the slide mold 16 is referred to as a front end part of the main body part 11c).

Figure 2:
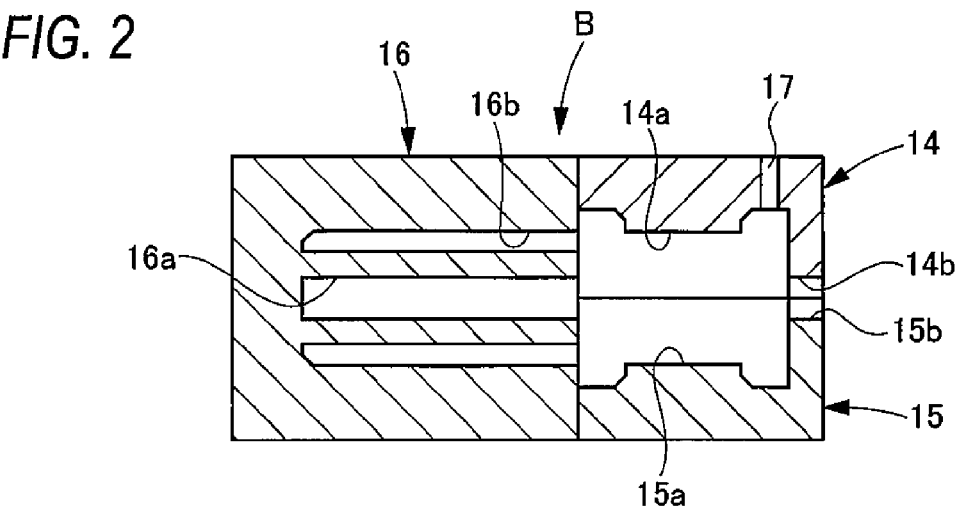
FIG. 2 is a longitudinally sectional view of a molding metal mold of the inner terminal shown in FIG. 1.

As shown in FIG. 2, when the upper mold 14 and the lower mold 15 are overlapped on each other in a vertical direction, the upper mold and the lower mold have therein spool shaped mold cavities 14a and 15a and semicircular holes 14b and 15b communicating with the mold cavities 14a and 15a to form a thin circular hole. The mold cavities 14a and 15a have one ends (left ends in the drawing) of the upper mold 14 and the lower mold 15 opened and the other ends (right ends in the drawing) of the upper mold 14 and the lower mold 15 opened through the semicircular holes 14b and 15b.

An inside diameter (an inside diameter of the above-described thin circular hole) of the semicircular holes 14b and 15b is formed so as to press the rear end of the main body part 11c in the vertical direction when the rear end part of the main body part 11c of the inner terminal 11 is interposed between the upper mold 14 and the lower mold 15 during the below-described insert molding (more specifically, to be slightly smaller than an outside diameter of the main body part 11c). Further, in the upper mold 14, an injection hole 17 of a resin material (an insulating material) is provided which communicates with the mold cavity 14a of the upper mold 14.

The slide mold 16 includes a central hole 16a and an annular hole 16b spaced from and arranged concentrically with the central hole 16a. In an end face (a right side end face in FIG. 2) of the slide mold 16, the central hole 16a and the annular hole 16b can communicate with the mold cavities 14a and 15a of the upper mold 14 and the lower mold 15.

The central hole 16a of the slide mold 16 has a length equal to that of the front end part of the main body part 11c of the inner terminal 11 held by the upper mold 14 and the lower mold 15 and a diameter of an inner periphery thereof is designed to have a size in which the front end part of the main body part 11c of the inner terminal 11 can be inserted (slid) without a space (more specifically, to be slightly smaller than an outside diameter of the main body part 11c). Further, the annular hole 16b serves as an area for forming a hood part 18d of a below-described resin material 18 to protect the inner terminal 11. The upper mold 14, the lower mold 15 and the slide mold 16 are arranged to mutually abut so that central axes of the central hole 16a, the spool hole and the thin circular hole are respectively aligned during the insert molding.

When the insert molding is started by using the metal mold B including the upper mold 14, the lower mold 15 and the slide mold 16 as described above, as shown in FIG. 1, a prescribed part of the main body part 11c of the inner terminal 11 is covered with the upper mold 14 and the lower mold 15 respectively from the upper and lower directions (a direction shown by an arrow mark a and a direction shown by an arrow mark b) to cover the rear end part of the main body part 11c of the inner terminal 11. Further, the slide mold 16 is moved in the axial direction of the inner terminal 11 (a direction shown by an arrow mark c) to cover the front end part of the main body part 11c of the inner terminal 11.

A state after the metal mold B is attached to the inner terminal 11 is shown in FIG. 1(b) and FIG. 3. Under this state, the semicircular holes 14b and 15b respectively press the rear end of the inner terminal 11 as described above. On the other hand, the central hole 16a of the slide mold 16 presses the outer periphery of the front end part of the main body part 11c inserted into the central hole 16a. Such a pressed state can be obtained by an elastic deformation of the main body part 11c itself by the slit 11d as described above.

Then, in the metal mold in which the upper mold 14, the lower mold 15 and the slide mold 16 are mutually butted against as shown in FIG. 2 and FIG. 3, the resin material (the insulating material) is injected to the mold cavities 14a and 15a from the injection hole 17. The injected resin material is spread in the mold cavities 14a and 15a, and further, the annular hole 16b of the slide mold 16 is gradually filled with the resin material.

In this case, as described above, since the semicircular holes 14b and 15b of the upper mold 14 and the lower mold 15 respectively press the rear end of the main body part 11c of the inner terminal 11 from the upper and lower directions, the resin material in the mold cavities 14a and 15a does not pass through a part between the semicircular holes 14b and 15b and the rear end of the main body part 11c to flow to the connecting part 11a or the pressure contact part 11b. Further, since the central hole 16a of the slide mold 16 presses the outer periphery of the front end part of the main body part 11c inserted into the central hole 16a, the resin material does not pass through a part between the central hole 16a and the front end part of the main body part 11c to flow to a front end of the inner terminal 11, that is, a connecting part to the inner terminal of the mate side connector.

Further, since the front end part of the main body part 11c of the inner terminal 11 is pressed by the slide mold 16 and the rear end part is pressed by the upper mold 14 and the lower mold 15 respectively, the slit 11d of the main body part 11c is closed, namely, one and the other end parts of the rectangular piece forming the slit 11d are laminated under a state that the end parts come into close contact with each other. Accordingly, the resin material in the mold cavities 14a and 15a does not pass through the slit 11d to flow to an inner part of the main body part 11c. As a result, the resin material does not pass through the inner part of the main body part 11c to flow to the front end of the main body part 11c and the connecting part 11a or the pressure contact part 11b.

On the other hand, after the resin material is injected to the metal mold B, when a prescribed time elapses, the resin material is solidified. Thus, subsequently, as shown in FIG. 1(c), the upper mold 14 is separated in a direction shown by an arrow mark d which is opposite to the above-described direction. Further, as shown in FIG. 1(d), the slide mold 16 is separated in a direction shown by an arrow mark e. Finally, the lower mold 15 is separated downward in a direction shown by an arrow mark f. In such a way, when the metal mold is released, the inner terminal 11 having the carrier 12 is insert molded which is covered with the spool shaped resin material 18 as shown in FIG. 4.

Figure 5:
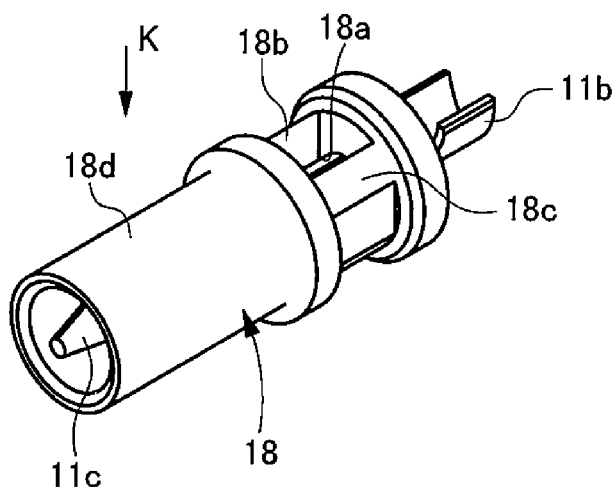
FIG. 5 is a perspective view showing the inner terminal according to the exemplary embodiment of the present invention.
Figure 6:
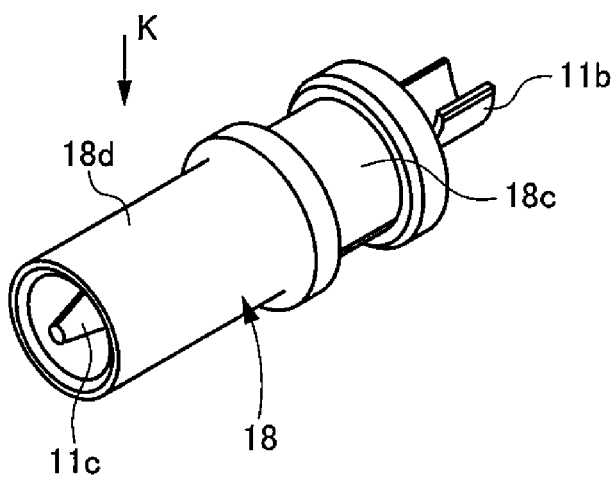
FIG. 6 is a perspective view showing an inner terminal according to another exemplary embodiment of the present invention.

The above-described insert molding is applied at the same time respectively to the plurality of inner terminals 11 continuously arranged in the carrier 12. Finally, the inner terminal 11 is separated from the carrier 12 in the connecting part 11a. Thus, such a single inner terminal parts (a molded product) K as shown in FIG. 5 is obtained. This inner terminal parts can be used for assembling a connector connected to the shield electric wire.

Figure 4:
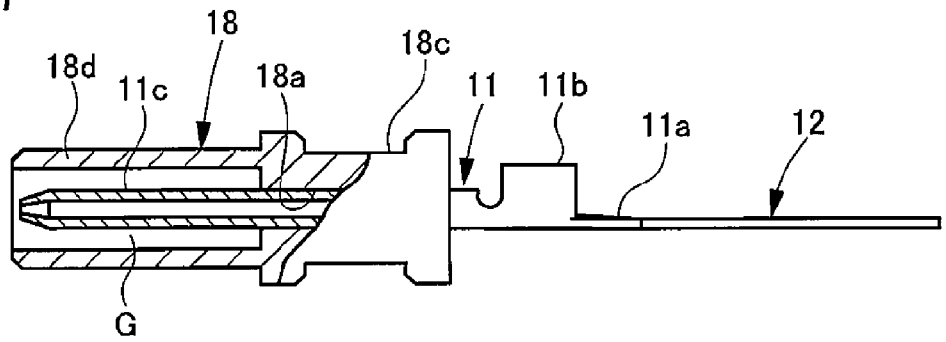
FIG. 4 is a front view showing that the insert molded inner terminal with a carrier is partly broken.

The resin material 18 forming the inner terminal parts K obtained herein includes, as shown in FIG. 4, a through hole 18a through which the main body part 11c of the inner terminal 11 passes, a plurality of cut out parts 18b as shown in FIG. 5 which communicate with the through hole 18a and are opened to an outer peripheral side of the resin material 18, a spool part 18c having a pair of flanges in an outer periphery and a hood part 18d which covers a periphery of the main body part (the male tab part) 11c of the inner terminal 11 through a prescribed gap G. To the cut-out parts 18b, what is called a lightening work is applied to adjust an impedance in the vicinity of the main body part 11c so as to be increased by exposing to an external part the main body part 11c passing though the through hole 18a. When the impedance is desired to be lowered, the through hole 18a is not necessary (see FIG. 6). When the form of the cut out part 18b is suitably changed, the impedance in the vicinity of the main body part 11c can be freely adjusted. In the background that the cut out parts 18b can be provided as described above, according to the insert molding method of the inner terminal 11 by the resin material 18, since a pressing-in operation of the inner terminal 11 to the resin material 18 is not necessary, a strength required for the resin material 18 can be decreased. As a result, a flexibility of the form of the resin material 18 is increased.

Figure 7:
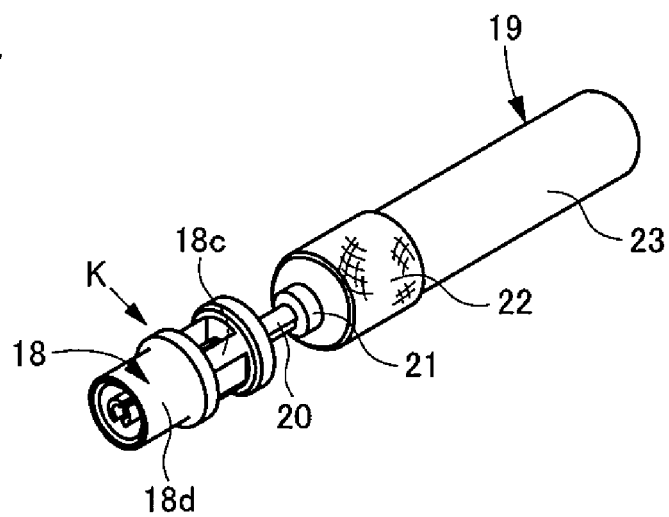
FIG. 7 is a perspective view showing a state that the inner terminal shown in FIG. 5 is connected to a core wire of a shield electric wire.

The inner terminal parts K having integrally the resin material 18 obtained as described above and the inner terminal 11 is caulked, as shown in FIG. 7, so as to cover an end of a core wire 20 of a shield electric wire 19 with the pressure contact part 11b of the inner terminal 11. Thus, the inner terminal 11 can be electrically and mechanically connected to the core wire 20. The shield electric wire 19 has a structure that an inner insulating coat 21, an outer conductor (a shield conductor) 22 and an outer insulating coat 23 are sequentially laminated on the core wire 20 of an inner conductor as a center. An end part of the outer conductor 22 is returned in an end of the outer insulating coat 23 so as to be overlapped thereon. In this exemplary embodiment, a coaxial cable is used as the shield electric wire 19.

Figure 8:
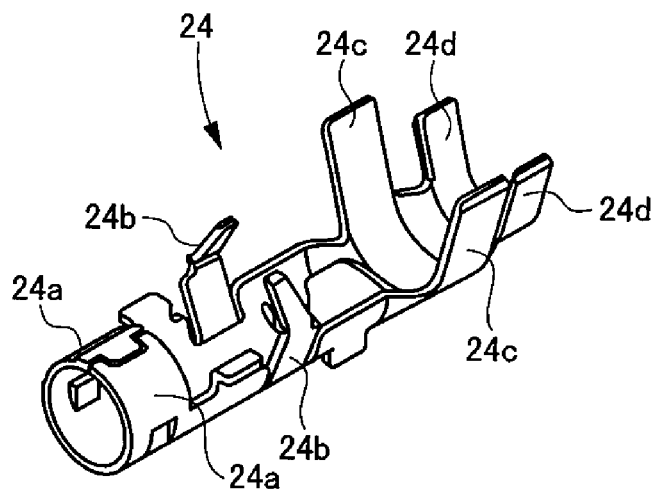
FIG. 8 is a perspective view of a shield member.

Then, a shield member 24 as shown in FIG. 8 is prepared. The shield member 24 is formed by press working an electrically conductive metal plate to a prescribed form, rounding a part of the metal plate in a cylindrical form and bending the other part in a circular arc shape. The shield member 24 includes in both sides of the above-described part, a cylinder forming part 24a, a pair of barrel parts 24b for holding the inner terminal parts K, a conductor holding part 24c for holding the outer conductor 22 of the shield electric wire 19 and an insulating coat holding part 24d for holding a part of the outer insulating coat 23.

Figure 9:
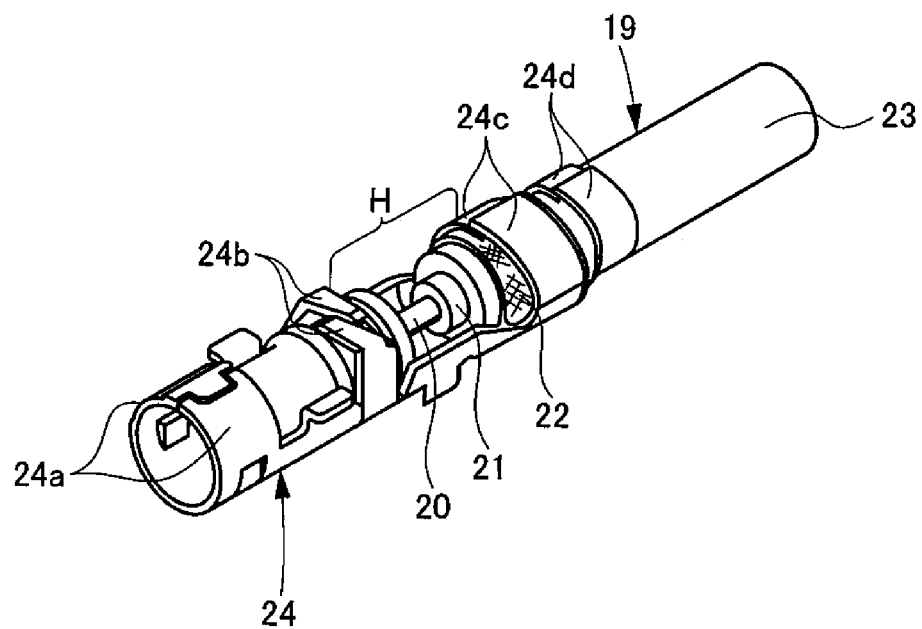
FIG. 9 is a perspective view showing a state that the shield member is attached to the shield electric wire and the inner terminal shown in FIG. 7.

The shield member 24 having the above-described structure is attached, as shown in FIG. 9, to the inner terminal parts K attached to the core wire 20 of the shield electric wire 19. Initially, the front end of the resin material 18 forming the inner terminal parts K is inserted into the cylinder forming part 24a previously worked to a cylindrical form and the barrel parts 24b are caulked on the spool part 18c. Further, the conductor holding part 24c is caulked on the returned part of the outer conductor (the shield conductor) 22 of an end of the shield electric wire 19. Then, further, the insulating coat holding part 24d is caulked on the outer insulating coat 23 of the shield electric wire 19. Thus, the shield member 24 is fixed to the inner terminal parts K.

Figure 10:
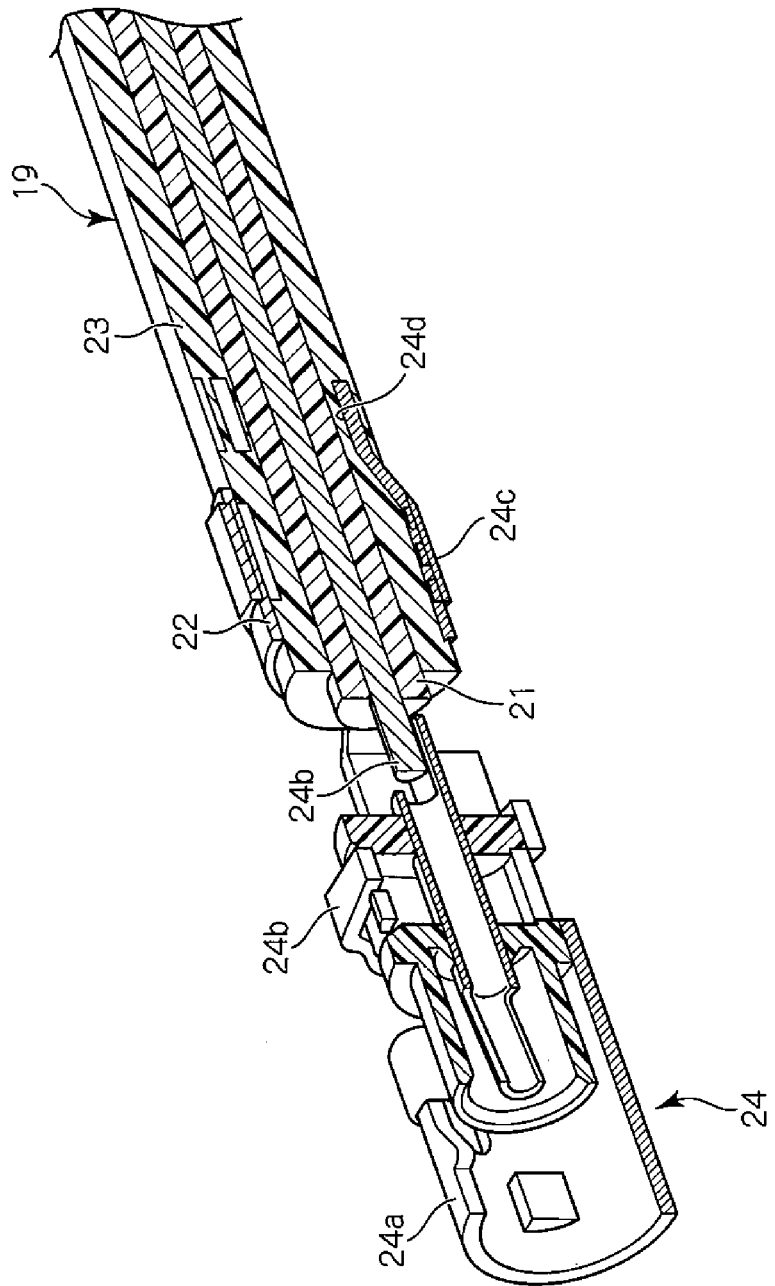
FIG. 10 is a longitudinally sectional perspective view of an attaching structure of the inner terminal and the shield member to the shield electric wire shown in FIG. 9.

In this case, in the connecting part of the connector to the shield electric wire 19, an area H that is not shielded by the shield member 24 is generated as shown in FIG. 9 and FIG. 10 for the reason of ensuring an area for connecting the core wire. In this area H, high frequency impedance in the connector is high, which causes a high frequency performance of a transmission path including the shield electric wire 19 to be deteriorated.

Thus, in the present exemplary embodiment, the thickness of a neck part of the spool part 18c of the resin material 18 caulked by the barrel part 24b is reduced. The thickness of the spool part 18c may be reduced by the insert molding of the inner terminal 11 as described above. As compared therewith, since a method for pressing-in the inner terminal 11 to the spool part 18c, which is usually carried out, has a fear of an accident that the spool part 18c may be possibly damaged or the inner terminal 11 may be possibly broken, it is not desired to use the small thickness of the spool part 18c.

On the other hand, in the present exemplary embodiment, it is extremely easy to reduce the thickness of the spool part 18c by the above-described insert molding. Although the spool part 18c is thin, the inner terminal can be attached to (formed integrally with) the inner terminal parts K including the spool part 18c without breaking the spool part 18c or injuring the inner terminal. As a result, since the thickness of the spool part 18c is reduced, a dielectric constant of the resin material forming the spool part can be adjusted. Consequently, the high frequency impedance can be lowered to an optimum value.

Accordingly, the impedance in the vicinity of the inner terminal parts K can be suppressed to an average value of low impedance in the thin part and the high impedance existing in the area to which the shield member is not applied. Accordingly, a high frequency property in the vicinity of the inner terminal parts K can be improved.

In the above-described exemplary embodiment, an example is shown that the cut out parts 18b are provided in the spool part 18c. The cut out parts 18b serve to expose the core wire 20 to outside air so as to increase the impedance in that part. Therefore, when the impedance of the area which is not covered with the shield member 24 is high, the inner terminal parts K is used which is not provided with the cut out part 18b in the resin material. The cut out part 18b may be suitably provided when the impedance needs to be adjusted.

As described above, according to the insert molding method and the inner terminal of the present invention, when the metal mold holds the main body part 11c of the inner terminal 11, the slit 11d is completely closed which is formed by covering one of the two end parts with the other to prevent the resin material from entering an inner part from an outer part of the main body part 11c. As a result, an electrical and mechanical connection of the inner terminal of the mate connector side to the inner terminal can be assuredly obtained and an electrical and mechanical connection to the core wire of the shield electric wire by soldering or caulking can be ensured.

The present invention is described in detail by referring to the specific exemplary embodiment. However, it is to be understood by a person with ordinary skill in the art that various changes or modifications may be made without departing form the spirit and scope of the present invention.

This application is based on Japanese Patent Application (JPA No. 2009-215919) filed on Sep. 17, 2009, and contents thereof are incorporated herein as a reference.

DESCRIPTION OF REFERENCE NUMERALS
AND SIGNS

11 . . . inner terminal 11a . . . connecting part 11b . . . pressure contact part 11c . . . main body part 11d . . . slit 12 . . . carrier 13 . . . fitting hole 14 . . . upper mold 15 . . . lower mold 14a, 15a . . . mold cavity 14b, 15b . . . semicircular hole 16 . . . slide mold 17 ... injection hole 18 ... resin material 19 ... shield electric wire 20 ... core wire 21 ... inner insulating coat 22 ... outer conductor (shield conductor) 23 ... outer insulating coat 24 ... shield member

The invention claimed is:

1. An insert molding method of an inner terminal using a metal mold, the inner terminal including a hollow and tubular main body part formed by covering one of two end parts of a rectangular piece with the other, and having a longitudinal slit between the one and the other end parts of the rectangular piece of the main body part, the metal mold having an opening with a diameter smaller than a diameter of the main body part such that there is a predetermined difference in diameter therebetween, the method comprising:

inserting the main body part of the inner terminal into the opening of the metal mold such that the slit is closed by the two end parts coming together due to the predetermined difference in diameter; and thereafter injecting a resin material into the metal mold such that the inner terminal is enclosed by the resin material and solidified without the resin material flowing inside the tubular main body part.

2. The insert molding method according to claim 1, wherein under a state that at least a rear end and an arbitrary part excluding the rear end of the main body part of the inner terminal is held by the metal mold, the resin material is injected.

3. The insert molding method according to claim 1, wherein the hollow and tubular main body part extends in a longitudinal direction of the rectangular piece and having a first opening at the first end of the inner terminal and a second opening at a second end of the inner terminal opposite the first end, and wherein at least one of first and second openings is open when the resin material is injected.

* * * * *